(12) United States Patent
Reddy et al.

(10) Patent No.: US 9,985,906 B2
(45) Date of Patent: May 29, 2018

(54) ESTIMATING TIME DURATION OF BANDWIDTH AVAILABILITY

(71) Applicant: Cisco Technology, Inc., San Jose, CA (US)

(72) Inventors: K. Tirumaleswar Reddy, Bangalore (IN); Prashanth Patil, Mountain View, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 15/283,554

(22) Filed: Oct. 3, 2016

(65) Prior Publication Data

US 2018/0097740 A1    Apr. 5, 2018

(51) Int. Cl.
| | |
|---|---|
| *H04L 12/927* | (2013.01) |
| *H04W 72/04* | (2009.01) |
| *H04W 24/08* | (2009.01) |
| *H04W 72/08* | (2009.01) |
| *H04W 84/12* | (2009.01) |
| *H04W 84/04* | (2009.01) |

(52) U.S. Cl.
CPC .......... *H04L 47/801* (2013.01); *H04W 24/08* (2013.01); *H04W 72/0453* (2013.01); *H04W 72/087* (2013.01); *H04W 84/042* (2013.01); *H04W 84/12* (2013.01)

(58) Field of Classification Search
CPC ............................. H04L 47/801; H04W 24/08; H04W 72/0453; H04W 72/087
See application file for complete search history.

(56) References Cited

U.S. PATENT DOCUMENTS 8,254,393 B2 *   8/2012   Horvitz ................. H04L 41/147
                                                                370/331
9,350,616 B1    5/2016   Lou et al.
(Continued)

OTHER PUBLICATIONS

Anjali, et al., "ABEst: An Available Bandwidth Estimator within an Autonomous System", in Proceedings of IEEE GLOBECOM'02, 2002, pp. 2360-2364, http://www.ece.iit.edu/.

(Continued)

*Primary Examiner* — Lakeram Jangbahadur
(74) *Attorney, Agent, or Firm* — Parker Ibrahim & Berg LLP; James M. Behmke; Stephen D. LeBarron (57) ABSTRACT

In one embodiment, a device in an access network receives network condition data regarding the access network and requested flow characteristic data. The requested flow characteristic data is indicative of one or more flow characteristics requested by one or more subscribers for different periods of time. The device trains a machine learning-based classifier using the network condition data and the request flow characteristic data and receives a particular flow characteristic request from a particular subscriber node. The particular request indicates one or more requested flow characteristics for a specified time period. The device determines a probability of the access network being able to accommodate the particular flow characteristic request by classifying the particular flow characteristic request using the trained classifier. The device sends a flow characteristic response to the node of the particular subscriber node based on the determined probability.

14 Claims, 7 Drawing Sheets

(56) References Cited

U.S. PATENT DOCUMENTS

2004/0008627 A1\* 1/2004 Garg .................. H04L 47/15
370/235
2015/0334030 A1 11/2015 Vasseur et al.
2016/0065476 A1 3/2016 Reddy et al.
2016/0308769 A1\* 10/2016 VerSteeg ................ H04L 47/12

OTHER PUBLICATIONS

Wing, et al., "PCP Flowdata Option", <draft-wing-pcp-flowdata-00>, Internet-Draft, Jul. 3, 2013, 17 pages, IETF Trust.
Yi, et al., "An empirical study of the multiscale predictability of network traffic." High performance Distributed Computing, 2004. Proceedings. 13th IEEE International Symposium on., pp. 66-76, 2004, IEEE.

\* cited by examiner

ESTIMATING TIME DURATION OF BANDWIDTH AVAILABILITY

TECHNICAL FIELD

The present disclosure relates generally to computer networks, and, more particularly, to estimating a time duration of bandwidth availability.

BACKGROUND

Enterprise networks are carrying a very fast growing volume of both business and non-business critical traffic. For example, traffic generated by a video conferencing application may be much less tolerant of network delays, jitter, etc. than non-critical traffic, such as simple webpage traffic. This complicates the task of optimizing network performance for specific applications, as many applications use the same protocols, thus making it difficult to distinguish and select traffic flows for optimization.

Access networks often have insufficient bandwidth or other characteristics that prevent some applications from functioning as well as desired. Although the quality of wireless and wired access networks continues to improve, those access networks are often constrained for various reasons. Consequently, it is often quite difficult for a subscriber in an access network to determine if there is sufficient bandwidth to perform high throughput/bandwidth exchanges over an extended amount of time (e.g., data backup/restore operations, large file downloads, interactive audio/video, streaming video etc.). Even if the network can initially accommodate the traffic requirements, the throughput will often drop off over longer periods of time, resulting in loss of connectivity or extremely slow data download/upload times which may impinge on the user experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in an access network receives network condition data regarding the access network and requested flow characteristic data. The requested flow characteristic data is indicative of one or more flow characteristics requested by one or more subscribers for different periods of time. The device trains a machine learning-based classifier using the network condition data and the request flow characteristic data. The device receives a particular flow characteristic request from a particular subscriber node. The particular request indicates one or more requested flow characteristics for a specified time period. The device determines a probability of the access network being able to accommodate the particular flow characteristic request by classifying the particular flow characteristic request using the trained classifier. The device sends a flow characteristic response to the particular subscriber node based on the determined probability of the access network being able to accommodate the particular flow characteristic request.

In further embodiments, a node in a subscriber network identifies one or more flow characteristic requirements for a traffic flow to be accommodated by an access network during a period of time. The node sends a flow characteristic request to a device of the access network indicative of the one or more flow characteristic requirements and the period of time. The node receives a flow characteristic response from the device. The flow characteristic response is based on a probability of the access network being able to accommodate the one or more flow characteristic requirements for the period of time. The probability is determined by a machine learning-based classifier trained using network condition data regarding the access network and one or more flow characteristic requests. The node initiates the traffic flow based on the flow characteristic response.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
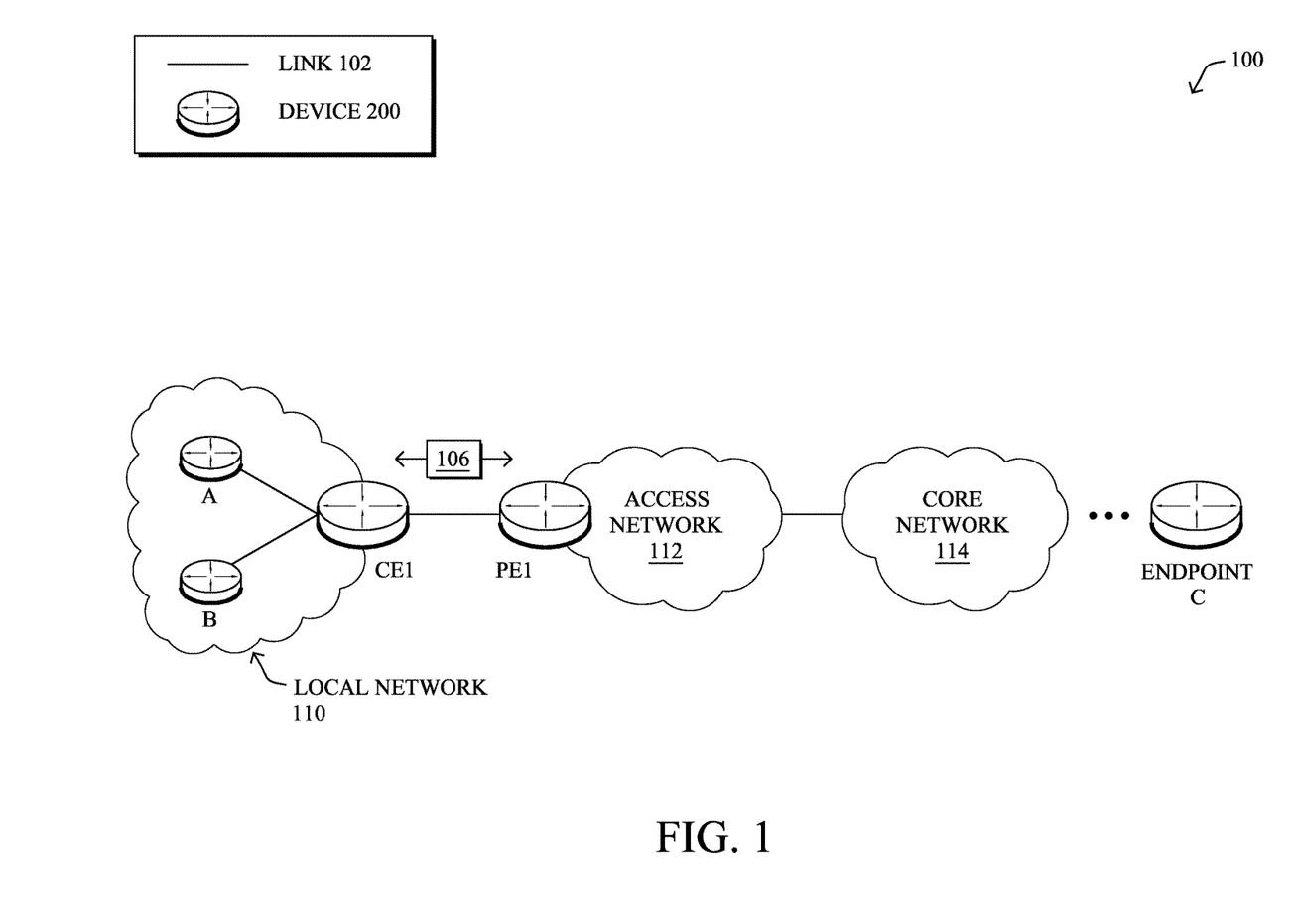
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet, a Multiprotocol Label Switching (MPLS) core network, or the like.

The various nodes/devices 200 may exchange data packets 106 (e.g., traffic/messages) via communication network 100 over links 102 using predefined network communication protocols such as the Transmission Control Protocol/

Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

In some implementations, CE1 or a set of CE routers for local network 110 may be connected to core network 114 via one or more links exhibiting very different network and service level agreement characteristics. Notably, local network 110 may include one or more CE routers that are connected to different access networks, allowing the routers to select which link to use for any given traffic. For example, local network 110 may be connected to two different Internet Service Providers (ISPs) via different access networks, and potentially to one or more backup links, as well (e.g., a cellular backup link, etc.).

Figure 2:
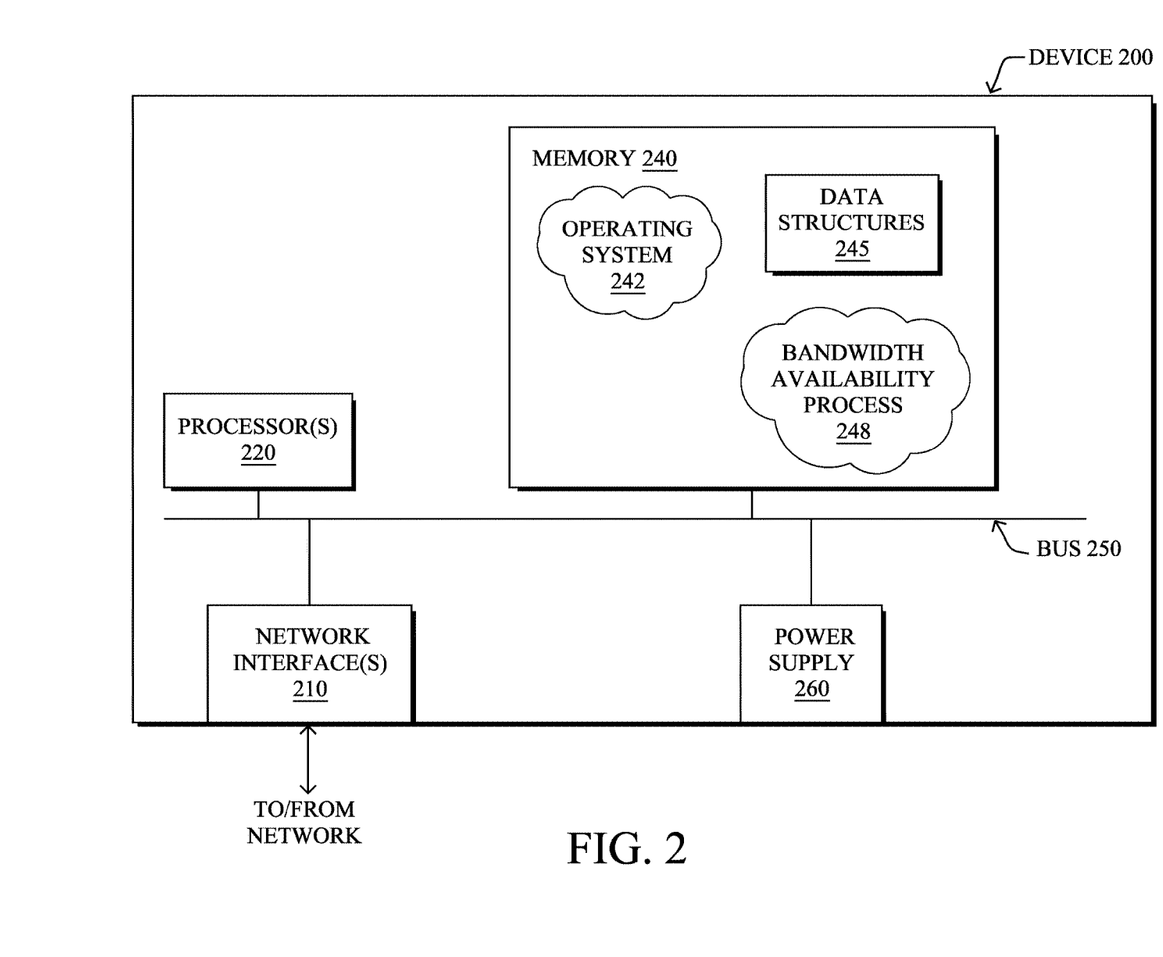
FIG. 2 illustrates an example network device/node.

FIG. 2 is a schematic block diagram of an example node/device 200 that may be used with one or more embodiments described herein, e.g., as any of the computing devices shown in FIG. 1, particularly routers CE1 and CE2, any other computing device that supports the operations of network 100 (e.g., switches, servers, etc.), or any of the other devices referenced below. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS™, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a bandwidth availability process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Certain network traffic may have different quality of service (QoS) requirements than other forms of traffic. For example, media streaming and conferencing applications (e.g., audio and/or video) may have very strict requirements in terms of jitter, latency, packet loss, etc., so as not to impinge on the user experience. Other application traffic, however, such as simple webpage traffic, may not be as susceptible to these factors, and may receive a lower network priority, accordingly.

In various embodiments, bandwidth availability process 248 may be configured to process bandwidth availability requests for specific time periods. For example, process 248 executing on a client device (e.g., a CE router, etc.) may send a request to a corresponding process 248 executing on a remote device (e.g., a device of an access network), to request a certain amount of bandwidth for a specified period of time. In turn, the remote device may determine whether the access network can accommodate the request and provide a response back to the requestor.

In various embodiments, process 248 may execute one or more machine learning-based classifiers, to determine whether a particular bandwidth availability request can be accommodated by the access network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, process 248 can use the model M to classify new data points, such as information regarding new traffic flows in the network. Often, M is a statistical model, and the cost function is inversely proportional to the likelihood of M, given the input data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

As noted above, the performance of an access network may vary considerably over the course of time. For certain traffic, this may negatively affect the user experience, even if the access network is initially able to accommodate the requirements of the traffic. As would be appreciated, in contrast to other networks that may guarantee one or more service level agreements (SLAs), many access networks do not specifically reserve resources for individual subscribers. This, it is often challenging from the perspective of a subscriber to plan for large data exchanges that require a threshold degree of performance.

Estimating Time Duration of Bandwidth Availability

The techniques herein provide a mechanism that allows a subscriber to query the access network, to statistically determine if a high throughput exchange can be performed at a desired time and for a desired duration. In some aspects, the access network may employ a machine learning-based classifier, to determine the probability of the access network being able to accommodate the request for the specified duration. Based on such a determination, the subscriber can then make an informed decision, such as selecting a link to use in the case of a multi-homed subscriber, etc. In some cases, the access network may even suggest a possible alternate time to initiate a traffic exchange, allowing the subscriber to time the operation appropriately (e.g., when to perform a backup, system upgrade, etc.).

Specifically, according to one or more embodiments of the disclosure, a device in an access network receives network condition data regarding the access network and requested flow characteristic data. The requested flow characteristic data is indicative of one or more flow characteristics requested by one or more subscribers for different periods of time. The device trains a machine learning-based classifier using the network condition data and the request flow characteristic data. The device receives a particular flow characteristic request from a particular subscriber node. The particular request indicates one or more requested flow characteristics for a specified time period. The device determines a probability of the access network being able to accommodate the particular flow characteristic request by classifying the particular flow characteristic request using the trained classifier. The device sends a flow characteristic response to the particular subscriber node based on the determined probability of the access network being able to accommodate the particular flow characteristic request.

Illustratively, the techniques described herein may be performed by hardware, software, and/or firmware, such as in accordance with the bandwidth availability process 248, which may include computer executable instructions executed by the processor 220 (or independent processor of interfaces 210) to perform functions relating to the techniques described herein.

Operationally, the proposed mechanism can be split into two parts: 1.) training a machine learning-based classifier to predict the duration of time for which the flow characteristics requested by the client/node can be met, and 2.) conveying the classification results from a particular request back to the requestor indicative of whether the access network can accommodate the requested flow characteristics for the specified time period (e.g., as a probability ranging from 0-1, etc.). As would be appreciated, the flow characteristics may include, but are not limited to, upstream/downstream bandwidth, upstream/downstream tolerance to delay, jitter, packet loss, combinations thereof, or the like.

FIGS. 3A-3D illustrate the training of a classifier to classify flow characteristic requests, according to various embodiments. Continuing the example of FIG. 1, assume that access network 112 includes a classifier device 300 configured to execute a machine-learning based classifier (e.g., process 248) and to process flow characteristic requests using the classifier. In some embodiments, classifier device 300 may be a separate device in access network 112 from PE1 and the other networking devices 302 in access network 112 (e.g., a first through $n^{th}$ networking device such as switches, routers, flow record generation devices, etc.). In other embodiments, PE1 or any of the other networking devices 302 may instead act as classifier device 300. Additionally, while client A is shown as part of a local subscriber network 110, other embodiments provide for client A to communicate directly with access network 112, in other implementations.

Figure 3A:
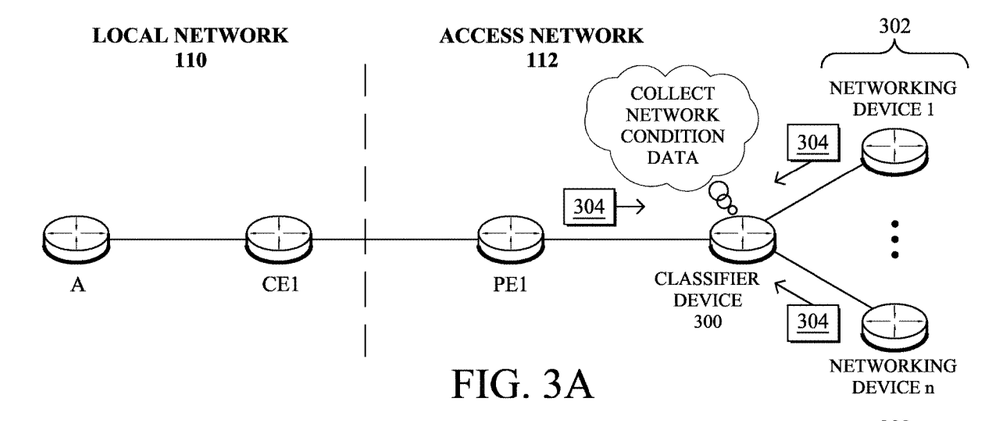
FIGS. 3A-3D illustrate the training of a classifier to classify flow characteristic requests.

As shown in FIG. 3A, classifier device 300 may receive network condition data 304 from PE1 and/or any of the other networking devices 302 in access network 112. Generally speaking, networking condition data 304 may include any information indicative of the operational state of access network 112. For example, network condition data 304 may indicate the current performance of links and/or paths in access network 112 in terms of available or used bandwidth (e.g., unidirectional or bidirectional), jitter, delays. Network condition data 304 may also, in some cases, indicate the operational states of PE1 or other networking devices 302 themselves, such as available resources (e.g., processing power, memory, etc.), queue states, or the like. In some implementations, for example, PE1 or any of the other networking devices 302 in access network 112 may send network condition data 304 as IP Flow Information Protocol (IPFIX) records, Netflow™ records from Cisco Systems, Inc., or the like.

Figure 3B:
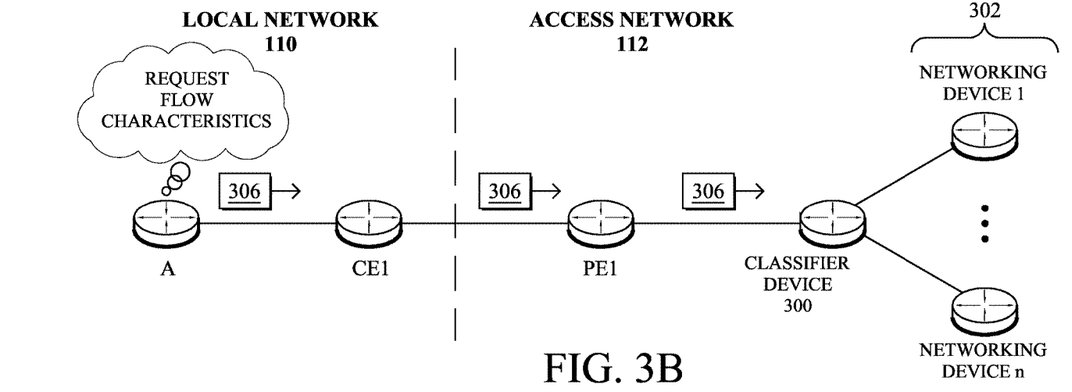

As shown in FIG. 3B, in addition to receiving network condition data regarding the state of access network 112, classifier device 300 may also receive input data indicative of flow characteristics requested by the clients/nodes in the various subscriber networks. For example, assume that client A in subscriber/local network 110 determines that one or more flow characteristics are required during a specific time period for a traffic flow/exchange (e.g., a scheduled upload or download, a media exchange, etc.). In such a case, client A may send a flow characteristic request 306 to access network 112 indicative of the one or more requested flow characteristics and specific time period for which the characteristics are requested.

Figure 3C:
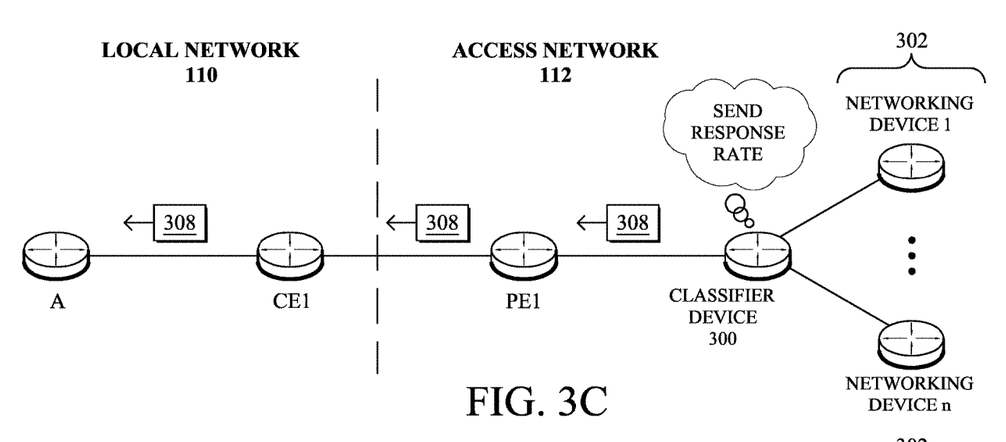

As shown in FIG. 3C, classifier device 300 or another device in the network (e.g., PE1) may make a determination as to whether access network 112 can accommodate flow characteristic request 306, either during the entirety of the specified time period, partially accommodated during the time period, or cannot be accommodated at all. In turn, classifier device 300 may send a flow characteristic response 308 back to client A in local network 110 indicative of the determination. In this way, classifier device 300 may also capture/receive input data for the flow characteristics requested by the various client, the times of the requests, and the responses to such requests (e.g., whether access network 112 can fully, partially, or not accommodate a given request).

Figure 3D:
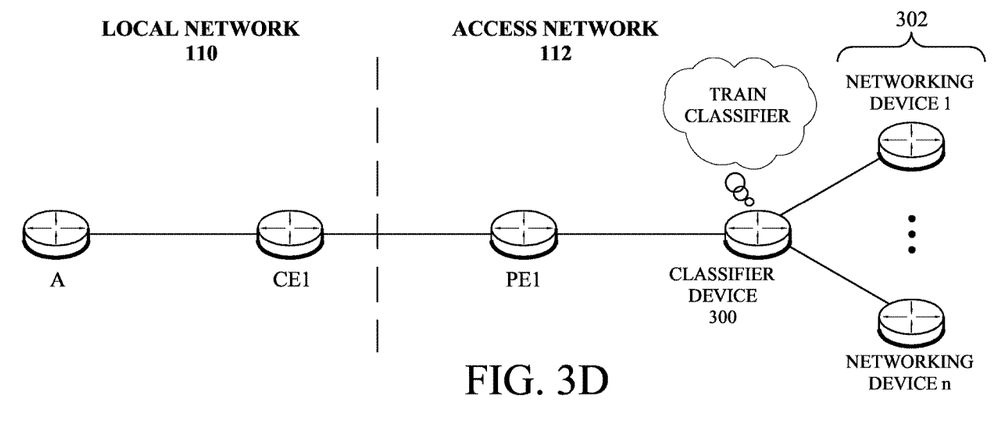

According to various embodiments, classifier device 300 may train a probabilistic machine learning-based classifier over a long period of time (e.g., hours, days, months) using the received network condition data 304 and the input data from the flow characteristic requests (e.g., the requested flow characteristics, the time periods, the response, etc.). Generally, such a classifier may classify a given flow characteristic request, to determine the probability that access network 112 is able to accommodate the request for the specified time period.

In some embodiments, whenever the conditions of access network 112 change (e.g., a change in the characteristics of a link, etc.), the corresponding networking device (e.g., device 302, PE1, etc.) may report the change to classifier device 300. In turn, classifier device 300 may retrain/update the classifier accordingly. For example, if the condition change indicates that the network would no longer be able to accommodate a given flow characteristic request (e.g., only partially accommodate the request or not be able to accommodate the request at all), the networking devices involved may inform classifier device 300 of the change. Similarly, if a network condition change occurs that would make access network 112 be able to accommodate a flow characteristic request, classifier device 300 may update its classifier, to account for the change. In doing so, the classifier will be able to better predict the ability of access network 112 to accommodate a given flow characteristic request.

Figure 4A:
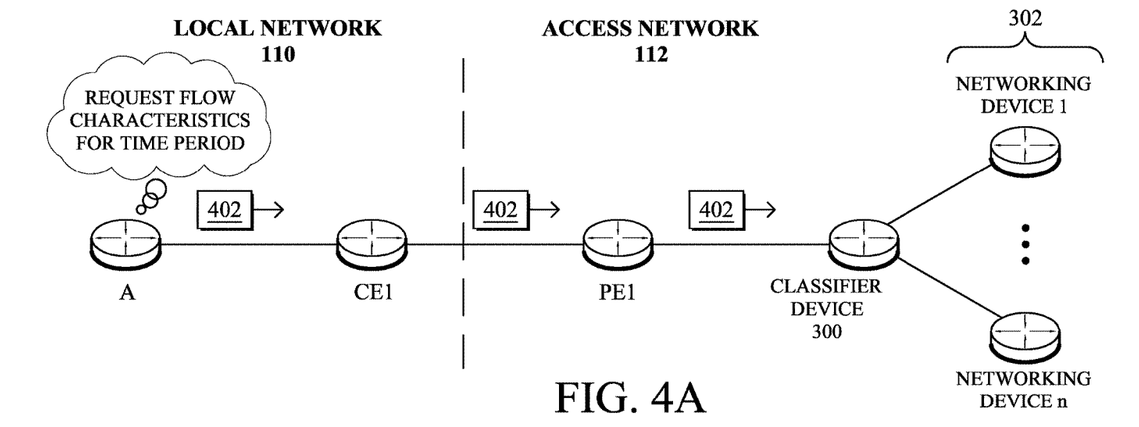
FIGS. 4A-4B illustrate a node sending a flow characteristic request to an access network.
Figure 4B:
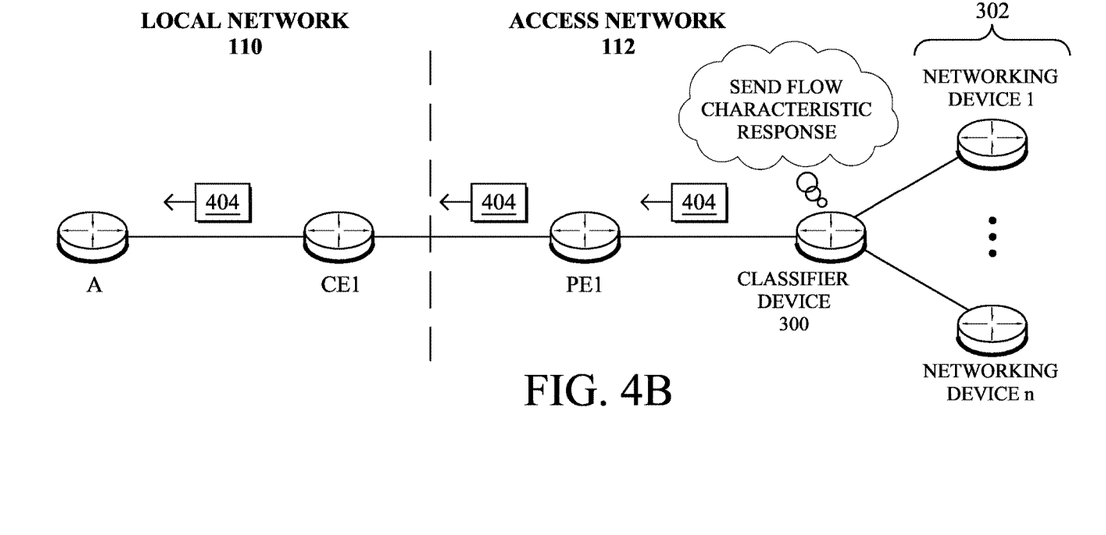

FIGS. 4A-4B illustrate client node A sending a flow characteristic request to access network 112, according to various embodiments. As shown in FIG. 4A, client A may identify one or more flow characteristics required by the node and a corresponding time period for the required characteristics. For example, assume that client A has a scheduled backup planned to start at 1:00 AM that may take an hour to complete. In such a case, client A may determine the appropriate bandwidth, etc. for the operation and the time period. In turn, client A may send flow characteristic request 402 to access network 112 indicative of the requested flow characteristics and the corresponding time period.

In FIG. 4B, classifier device 300 may use its trained classifier to classify request 402, to determine whether access network 112 can accommodate request 402. For example, classifier device 300 may use the requested flow characteristics, the time duration for which the flow characteristics are requested, time-of-the-day, day-of-the-week, week-of-the-month, month-of-the-year, public holiday, etc. information in request 402 as input to its classifier. In some embodiments, the classifier may output a probability of access network 112 being able to accommodate the request.

In some cases, such as when a low probability is determined (e.g., below a threshold), classifier device 300 may vary the timing information of the inputs, to identify a suggested alternate time period. For example, if access network 112 cannot accommodate the flow characteristics between 1:00-2:00 AM, classifier device 300 may assess other time periods and determine that access network 112 could instead accommodate the requirements during the time period of 2:00-3:00 AM.

As shown, classifier device 300 may send a flow characteristic response 404 back to client A based on the classification of request 402. In some embodiments, response 404 may simply include the determined probability of access network 112 being able to accommodate request 402. In other embodiments, response 404 may map the probability into various categories (e.g., yes, no, or partially). In further embodiments, response 404 may also include a suggested alternate time period.

In response to receiving response 404, client A and/or the other devices in local network 110 (e.g., CE1) may use the response information to control when and how the corresponding traffic flow(s) are sent. For example, client A may priority its network interfaces (e.g., pick among WiFi and mobile/cellular networks) or, alternatively, CE1 may pick between using access network 112 or another provider for the flow(s). Further, the information in response 404 can be used to learn the likelihood of bandwidth availability, etc., at various times of day or learn the likelihood that access network 112 will not be congested during certain time periods. In turn, specific applications (e.g., backups, software upgrades, etc.) can be schedule to run at specific times during the day, week, year, when the flow characteristics required will most likely be available or access network 112 will not be congested.

Figure 5:
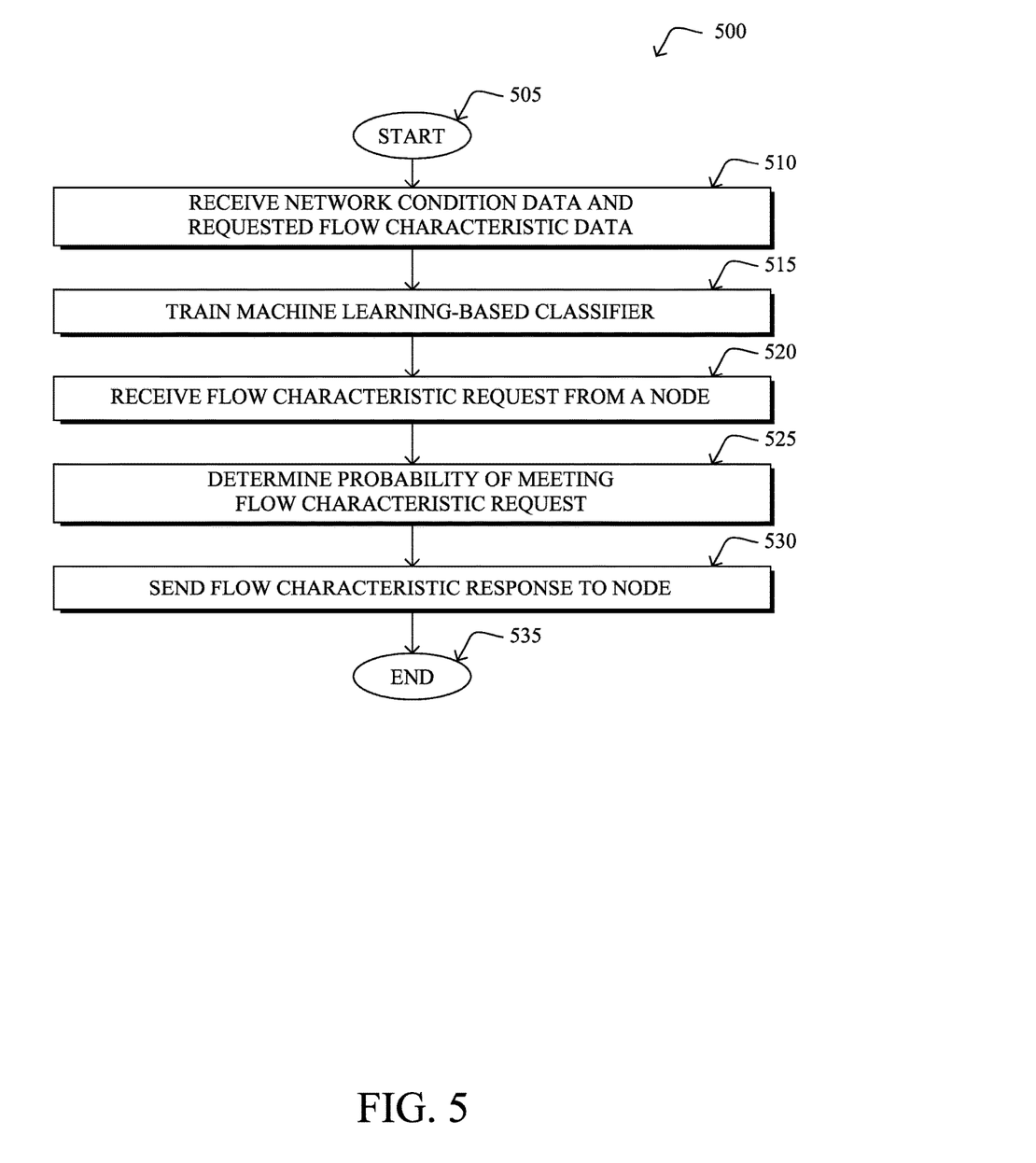
FIG. 5 illustrates an example simplified procedure for using a machine learning-based classifier to process a flow characteristic request.

FIG. 5 illustrates an example simplified procedure for using a machine learning-based classifier to process a flow characteristic request in an access network in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device receives network condition data and flow characteristic data. The network condition data may generally indicate the performance and conditions of the access network. For example, this data may include, but is not limited to, upstream and/or downstream delay tolerances or other measures, loss tolerances or other measures, jitter tolerances or other measures, maximum or minimum bandwidths, or the like, in the network. Similarly, the flow characteristic data may indicate one or more flow characteristics requested by one or more subscribers and the time periods for which the characteristics were requested.

At step 515, as detailed above, the device may train a machine learning-based classifier. More specifically, the device may train the classifier using the received network condition data and flow characteristic data, to classify subsequent flow characteristic requests. In some embodiments, the classifier may be a probabilistic classifier that outputs a probability of the access network being able to accommodate a particular flow characteristic request. For example, the classifier may be trained using the network condition data and the characteristics requested by one or more clients using (e.g., the requested flow characteristics, the time duration for which the flow characteristics are requested, the time of the request, the outcome of such a request indicative of whether the request can be accommodated, partially accommodated, or not accommodated, etc.).

At step 520, the device may receive a particular flow characteristic request from a subscriber node, as described in detail above. For example, such a node may be an individual client device, a CE router of a subscriber network, or the like. Generally, the flow characteristic request may indicate one or more flow characteristics (e.g., bandwidth, jitter, etc.) requested by the node for a specified time period. For example, if the node is scheduled to download an updated between 4:00-5:00 AM, the node may send a request to the device indicating the required bandwidth to complete the download.

At step 525, as detailed above, the device may determine a probability of the access network being able to accommodate the request of step 520. For example, the device may use the information from the request as input to its classifier, to determine the probability. The device may also, in some cases, determine alternative time periods during which the access network could meet the request, if the device determines that the network cannot accommodate the initial request at the specified time.

At step 530, the device may send a flow characteristic response to the subscriber node, as described in greater detail above. The response may be based on the determined probability from step 525 and indicate whether the access network can accommodate the particular flow characteristic request. In turn, the subscriber node may use this information to make a more informed decision about which access network to use and when. For example, in some cases, the response may also indicate a suggested alternate time period. In turn, the subscriber node may schedule the flow(s) around this suggested time, instead. Procedure 500 then ends at step 535.

Figure 6:
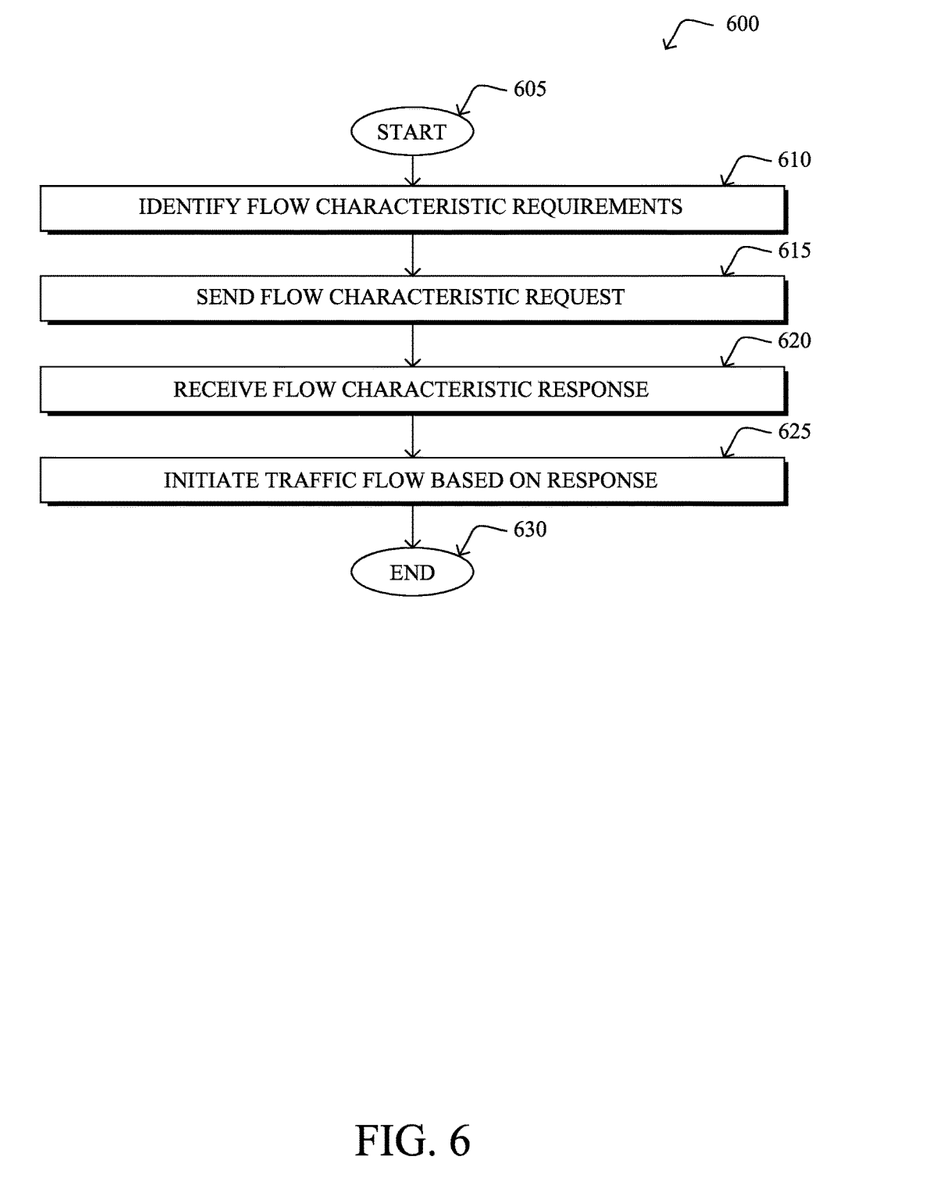
FIG. 6 illustrates an example simplified procedure for requesting flow characteristics for a time period.

FIG. 6 illustrates an example simplified procedure for requesting flow characteristics for a time period in accordance with one or more embodiments herein. The procedure 600 may be performed, e.g., by a non-generic, specifically configured node (e.g., by executing a process 248). Procedure 600 may start at step 605 and continues on to step 610 where, as described in greater detail above, the node may identify one or more flow characteristic requirements for a traffic flow to be accommodated by an access network during a specific period of time. For example, if the node is to perform an upload or download at a scheduled time, the node may identify the corresponding bandwidth requirements for the flow.

At step 615, as detailed above, the node may send a flow characteristic request to a device of an access network. Such a request may indicate, for example, the one or more flow characteristic requirements identified in step 610, as well as the requested time period.

At step 620, the node may receive a flow characteristic response from the device of the access network that indicates whether the access network can accommodate the flow characteristic request. In various embodiments, the device of the access network may base the response on a classification of the flow characteristic request using a machine learning-based classifier. For example, the classifier may be trained using network characteristic data and other request input data, to determine a probability of the access network being able to accommodate the request of step 615.

At step 625, as detailed above, the device may initiate the traffic flow based on the flow characteristic response. For example, in some embodiments, the node may select an access network to use, based on the response (e.g., if the queried access network cannot accommodate the request, the node may use another access network, etc.). In further embodiments, the node may opt to initiate the traffic flow at a different time than indicated in the request, such as during a suggested time period indicated in the flow characteristic response. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow subscribers to query an access network, to determine if the access network can accommodate the requirements of certain flows such as data backups, restores, large file downloads, interactive audio/video, streaming video, or the like. In some cases, this allows a multi-homed subscriber to potentially switch to the access network that provides the best probability of being able to accommodate the desired flow. In further cases, the access network may even suggest a suitable time for the desired exchange, allowing the subscribers to plan and time the exchanges appropriately.

While there have been shown and described illustrative embodiments that provide for the estimation of flow characteristics for an access network, such as estimated bandwidth availability, it is to be understood that various other adaptations and modifications may be made within the spirit and scope of the embodiments herein. For example, while certain embodiments are described herein with respect to using certain types of machine learning-based approaches, the techniques herein may use other approaches, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in an access network, network condition data regarding the access network and requested flow characteristic data, wherein the requested flow characteristic data is indicative of one or more flow characteristics requested by one or more subscribers for different periods of time;
training, by the device, a machine learning-based classifier using the network condition data and the request flow characteristic data;
receiving, at the device, a particular flow characteristic request from a particular subscriber node, wherein the particular request indicates one or more requested flow characteristics for a specified time period;
determining, by the device, a probability of the access network being able to accommodate the particular flow characteristic request by classifying the particular flow characteristic request using the trained classifier;
sending, by the device, a flow characteristic response to the node of the particular subscriber node based on the determined probability of the access network being able to accommodate the particular flow characteristic request;
receiving, at the device, data indicative of a condition change in the access network and when the condition change took place, wherein the data indicative of the condition change in the access network further indicates when the condition change took place, and wherein the condition change caused the network to be unable to accommodate a flow characteristic requested by one of the subscribers; and retraining, by the device, the machine learning-based classifier using the data indicative of the condition change in the access network.

2. The method as in claim 1, wherein the one or more requested flow characteristics for the specified time period of the particular request comprise a requested bandwidth for the specified time period.

3. The method as in claim 1, wherein the flow characteristic response indicates the determined probability of the access network being able to accommodate the particular flow characteristic request.

4. The method as in claim 1, wherein the subscriber node initiates a traffic flow based on the flow characteristic response.

5. The method as in claim 1, further comprising:
determining, by the device, an alternative time period during which the access network accommodates the particular flow characteristic request, wherein the flow characteristic response indicates the determined alternative time period.

6. An apparatus, comprising:
one or more network interfaces to communicate with a network;
a processor coupled to the network interfaces and configured to execute one or more processes; and
a memory configured to store a process executable by the processor, the process when executed operable to:
receive network condition data regarding an access network and requested flow characteristic data, wherein the requested flow characteristic data is indicative of one or more flow characteristics requested by one or more subscribers for different periods of time;
train a machine learning-based classifier using the network condition data and the request flow characteristic data;
receive a particular flow characteristic request from a particular subscriber node, wherein the particular request indicates one or more requested flow characteristics for a specified time period;
determine a probability of the access network being able to accommodate the particular flow characteristic request by classifying the particular flow characteristic request using the trained classifier;
send a flow characteristic response to the particular subscriber node based on the determined probability of the access network being able to accommodate the particular flow characteristic request;
receive data indicative of a condition change in the access network and when the condition change took place, wherein the data indicative of the condition change in the access network further indicates when the condition change took place, and wherein the condition change caused the network to be able to only partially accommodate a flow characteristic requested by one of the subscribers; and
retrain the machine learning-based classifier using the data indicative of the condition change in the access network.

7. The apparatus as in claim 6, wherein the one or more requested flow characteristics for the specified time period of the particular request comprise a requested bandwidth for the specified time period.

8. The apparatus as in claim 6, wherein the flow characteristic response indicates that the access network is able to partially accommodate the particular flow characteristic request.

9. The apparatus as in claim 6, wherein the subscriber node initiates a traffic flow based on the flow characteristic response.

10. The apparatus as in claim 6, wherein the process when executed is further operable to:
determine an alternative time period during which the access network accommodates the particular flow characteristic request, wherein the flow characteristic response indicates the determined alternative time period.

11. A method comprising:
receiving, at a device in an access network, network condition data regarding the access network and requested flow characteristic data, wherein the requested flow characteristic data is indicative of one or more flow characteristics requested by one or more subscribers for different periods of time;
training, by the device, a machine learning-based classifier using the network condition data and the request flow characteristic data;
receiving, at the device, a particular flow characteristic request from a particular subscriber node, wherein the particular request indicates one or more requested flow characteristics for a specified time period;
determining, by the device, a probability of the access network being able to accommodate the particular flow characteristic request by classifying the particular flow characteristic request using the trained classifier;
sending, by the device, a flow characteristic response to the node of the particular subscriber node based on the determined probability of the access network being able to accommodate the particular flow characteristic request;
receiving, at the device, data indicative of a condition change in the access network and when the condition change took place, wherein the data indicative of the condition change in the access network further indicates when the condition change took place, and wherein the condition change caused the network to be able to accommodate a flow characteristic requested by one of the subscribers; and
retraining, by the device, the machine learning-based classifier using the data indicative of the condition change in the access network.

12. The method as in claim 11, wherein the one or more requested flow characteristics for the specified time period of the particular request comprise a requested bandwidth for the specified time period.

13. The method as in claim 11, wherein the flow characteristic response indicates the determined probability of the access network being able to accommodate the particular flow characteristic request.

14. The method as in claim 11, further comprising:
determining, by the device, an alternative time period during which the access network accommodates the particular flow characteristic request, wherein the flow characteristic response indicates the determined alternative time period.

* * * * *